(12) United States Patent
Horvitz (10) Patent No.: US 7,240,011 B2
(45) Date of Patent: *Jul. 3, 2007

(54) CONTROLLING THE LISTENING HORIZON OF AN AUTOMATIC SPEECH RECOGNITION SYSTEM FOR USE IN HANDSFREE CONVERSATIONAL DIALOGUE

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/257,249

(22) Filed: Oct. 24, 2005

(65) Prior Publication Data

US 2006/0036445 A1    Feb. 16, 2006

Related U.S. Application Data

(63) Continuation of application No. 10/885,946, filed on Jul. 7, 2004, now Pat. No. 6,988,072, which is a continuation of application No. 10/190,978, filed on Jul. 8, 2002, now Pat. No. 6,782,364, which is a continuation of application No. 09/312,679, filed on May 17, 1999, now Pat. No. 6,434,527.

(51) Int. Cl.
*G10L 15/22* (2006.01)

(52) U.S. Cl. .................................. 704/275; 704/251

(58) Field of Classification Search .................. None
See application file for complete search history.

(56) References Cited

U.S. PATENT DOCUMENTS 5,029,214 A    7/1991  Hollander
5,493,692 A    2/1996  Theimer et al.
5,544,321 A    8/1996  Theimer et al.
5,555,376 A    9/1996  Theimer et al.
5,603,054 A    2/1997  Theimer et al.
5,611,050 A    3/1997  Theimer et al.
5,632,002 A    5/1997  Hashimoto et al.
5,652,789 A    7/1997  Miner et al.
5,812,865 A    9/1998  Theimer et al.
5,860,059 A    1/1999  Aust et al.
5,864,848 A    1/1999  Horvitz et al.
5,917,891 A *  6/1999  Will .......................... 379/88.03
6,018,711 A    1/2000  French-St. George et al.
6,021,403 A    2/2000  Horvitz et al.

(Continued)

FOREIGN PATENT DOCUMENTS

| WO | WO 97/41521 | 11/1997 |
|----|-------------|---------|
| WO | 9800787     | 1/1998  |
| WO | WO 98/03907 | 1/1998  |

OTHER PUBLICATIONS

Judea Pearl, "Probabilistic Reasoning in Intelligent Systems: Networks of Plausible Inference" Apr. 1997, ISBN 1558604790.

(Continued)

*Primary Examiner*—Donald L. Storm
(74) *Attorney, Agent, or Firm*—Amin, Turocy & Calvin, LLP (57) ABSTRACT

Conversational dialog with a computer or other processor-based device without requiring push-to-talk functionality. In one embodiment, a computer-implemented method first determines that a user desires to engage in a dialog. Based thereon the method turns on a speech recognition functionality for a period of time referred to as a listening horizon. Upon the listening horizon expiring, the method turns off the speech recognition functionality.

18 Claims, 5 Drawing Sheets

U.S. PATENT DOCUMENTS

| | | | |
|---|---|---|---|
| 6,055,531 | A * | 4/2000 | Bennett et al. ............... 707/5 |
| 6,118,888 | A | 9/2000 | Chino et al. |
| 6,144,938 | A | 11/2000 | Surace et al. |
| 6,233,570 | B1 | 5/2001 | Horvitz et al. |
| 6,260,035 | B1 | 7/2001 | Horvitz et al. |
| 6,262,730 | B1 | 7/2001 | Horvitz |
| 6,269,336 | B1 | 7/2001 | Ladd et al. |
| 6,327,581 | B1 | 12/2001 | Platt |
| 6,434,527 | B1 | 8/2002 | Horvitz |
| 6,466,232 | B1 | 10/2002 | Newell et al. |
| 6,513,046 | B1 | 1/2003 | Abbott, III et al. |
| 6,549,915 | B2 | 4/2003 | Abbott, III et al. |
| 6,571,210 | B2 | 5/2003 | Hon et al. |
| 6,747,675 | B1 | 6/2004 | Abbott et al. |
| 6,791,580 | B1 | 9/2004 | Abbott et al. |
| 6,801,223 | B1 | 10/2004 | Abbott et al. |
| 6,812,937 | B1 | 11/2004 | Abbott et al. |
| 6,842,877 | B2 | 1/2005 | Robarts et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2005/0034078 | A1 | 2/2005 | Abbott et al. |

OTHER PUBLICATIONS

Eric Horvitz et al, "Display of Information for Time-Critical Decision-Making", Proceedings of Eleventh Conference on Uncertainty in Artificial Intelligence, Aug. 1995, Montreal.

Eric Horvitz et al., "The Lumiere Project: Bayesian User Modeling for Inferring the Golds and Need of Software Useres", Proceeding of the Fourteenth Conference on Uncertainty in Artificial Intelligence, Jul. 1998, pp. 256-265, Morgan Kaufmann Publishers, Madison, WI.

David Heckerman et al., "Inferring Information Goals from Free-Text Queries: A Bayesian Approach", Proceedings of the Fourteenth Conference on Uncertainty in Artificial Intelligence, Jul. 1998, pp. 230/237, Norgan Kaufmann Publishers, Madison, WI.

Susan Dumais et al., "Inductive Learning Algorithms and Representations for Text Categorization", Proceedings of AMC-CIKM98, Nov. 1998.

Ben Shneiderman et al., "Direct Manipulation vs Interface Agents: Excerpts from debates at IUI 97 and CHI 97", interactions, Nov.-Dec. 1997, pp. 42-61.

M. Sahami et al., "A Bayesian Approach to Filtering Junk E-mail", AAAI Workshop on Text Classification, AAAI Technical Report WS-98-05, Jul. 1998, Madison, Wisconsin.

Internet web page entitled "Speech Application Programming Interface (SAPI)," http://microsoft.com/iit/projects/sapisdk.htm (printed May 7, 1999).

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, Univeristy of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

CONTROLLING THE LISTENING HORIZON OF AN AUTOMATIC SPEECH RECOGNITION SYSTEM FOR USE IN HANDSFREE CONVERSATIONAL DIALOGUE

CROSS REFERENCE TO RELATED APPLICATION

This application is a continuation of U.S. patent application Ser. No. 10/885,946 filed Jul. 7, 2004 and entitled "CONTROLLING THE LISTENING HORIZON OF AN AUTOMATIC SPEECH RECOGNITION SYSTEM FOR USE IN HANDSFREE CONVERSATIONAL DIALOGUE" (now issued U.S. Pat. No. 6,988,072), which is a continuation of U.S. patent application Ser. No. 10/190,978 filed Jul. 8, 2002 and entitled "CONTROLLING A LISTENING HORIZON OF A SPEECH RECOGNITION SYSTEM FOR USE IN HANDSFREE CONVERSATIONAL DIALOG" (now issued U.S. Pat. No. 6,782,364), which is a continuation of U.S. patent application Ser. No. 09/312,679 filed May 17, 1999 and entitled "SIGNALING AND CONTROLLING THE STATUS OF AN AUTOMATIC SPEECH RECOGNITION SYSTEM FOR USE IN HANDSFREE CONVERSATIONAL DIALOGUE" (now issued U.S. Pat. No. 6,434,527). The aforementioned applications are incorporated herein by reference.

FIELD OF THE INVENTION

This invention relates generally to conversational dialog between a computer or other processor-based device and a user, and more particularly to such dialog without requiring push-to-talk functionality.

BACKGROUND OF THE INVENTION

Speech recognition applications have become increasingly popular with computer users. Speech recognition allows a user to talk into a microphone connected to the computer, and the computer translating the speech into recognizable text or commands understandable to the computer. There are several different types of uses for such speech recognition. In one type, speech recognition is used as an input mechanism for the user to input text into a program, such as a word processing program, in lieu of or in conjunction with a keyboard. In another type, speech recognition is used as a mechanism to convey commands to a program—for example to save a file in a program, instead of selecting a save command from a menu using a mouse.

In yet another type of use for speech recognition, speech recognition is used in conjunction with an on-screen agent or automated assistant. For example, the agent may ask the user whether he or she wishes to schedule an appointment in a calendar based on an electronic mail the user is reading— e.g., using a text-to-speech application to render audible the question through a speaker, or by displaying text near the agent such that it appears that the agent is talking to the user. Speech recognition can then be used to indicate the user's acceptance or declination of the agent's offer.

In these and other types of uses for speech recognition, an issue lies as to when to turn on the speech recognition engine—that is, as to when the computer should listen to the microphone for user speech. This is because in part speech recognition is a processor-intensive application; keeping speech recognition turned on all the time may slow down other applications being run on the computer. In addition, keeping speech recognition turned on all the time may not be desirable, in that the user may accidentally say something into the microphone that was not meant for the computer.

One solution to this problem is generally referred to as "push-to-talk." In push-to-talk systems, a user presses a button on an input device such as a mouse, or presses a key or a key combination on the keyboard, to indicate to the user that it is ready to speak into the microphone such that the computer should listen to the speech. The user may optionally then be required to push another button to stop the computer from listening, or the computer may determine when to stop listening based on no more speech being spoken by the user.

Push-to-talk systems are disadvantageous, however. A goal in speech recognition systems is to provide for a more natural manner by which a user communicates with a computer. However, requiring a user to push a button prior to speaking to the computer cuts against this goal, so it is unnatural for the user to do so. Furthermore, in applications where a dialog is to be maintained with the computer—for example, where an agent asks a question, the user answers, and the agent asks another question, etc.—requiring the user to push a button is inconvenient and unintuitive, in addition to being unnatural.

Other prior art systems include those that give the user an explicit, unnatural message to indicate that the system is listening. For example, in the context of automated phone applications, a user may be hear a recorded voice "Press 1 now for choice A." While this may improve on push-to-talk systems, it nevertheless is unnatural. That is, in everyday conversation between people, such explicit messages to indicate that one party is ready to listen to the other is rarely heard.

For these and other reasons, there is a need for the present invention.

SUMMARY OF THE INVENTION

The invention relates to conversational dialog with a computer or other processor-based device without requiring push-to-talk functionality. In one embodiment, a computer-implemented method first determines that a user desires to engage in a dialog. Next, based thereon the method turns on a speech recognition functionality for a period of time referred to as a listening horizon. Upon the listening horizon expiring, the method turns off the speech recognition functionality.

In specific embodiments, determining that a user desires to engage in a dialog includes performing a probabilistic cost-benefit analysis to determine whether engaging in a dialog is the highest expected utility action of the user. This may include, for example, initially inferring a probability that the user desires an automated service with agent assistance. Thus, in one embodiment, the length of the listening horizon can be determined as a function of at least the inferred probability that the user desires automated service, as well as a function of the acute listening history of previous dialogs.

Embodiments of the invention provide for advantages not found within the prior art. Primarily, the invention does not require push-to-talk functionality for the user to engage in a dialog with the computer including engaging in a natural dialog about a failure to understand. This means that the dialog is more natural to the user, and also more convenient and intuitive to the user. Thus, in one embodiment, an agent may be displayed on the screen, ask the user a question using a text-to-speech mechanism, and then wait for the listening horizon for an appropriate response from the user. The user only has to talk after the agent asks the question, and does not have to undertake an unnatural action such as pushing a button on an input device or a key on the keyboard prior to answering the query.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
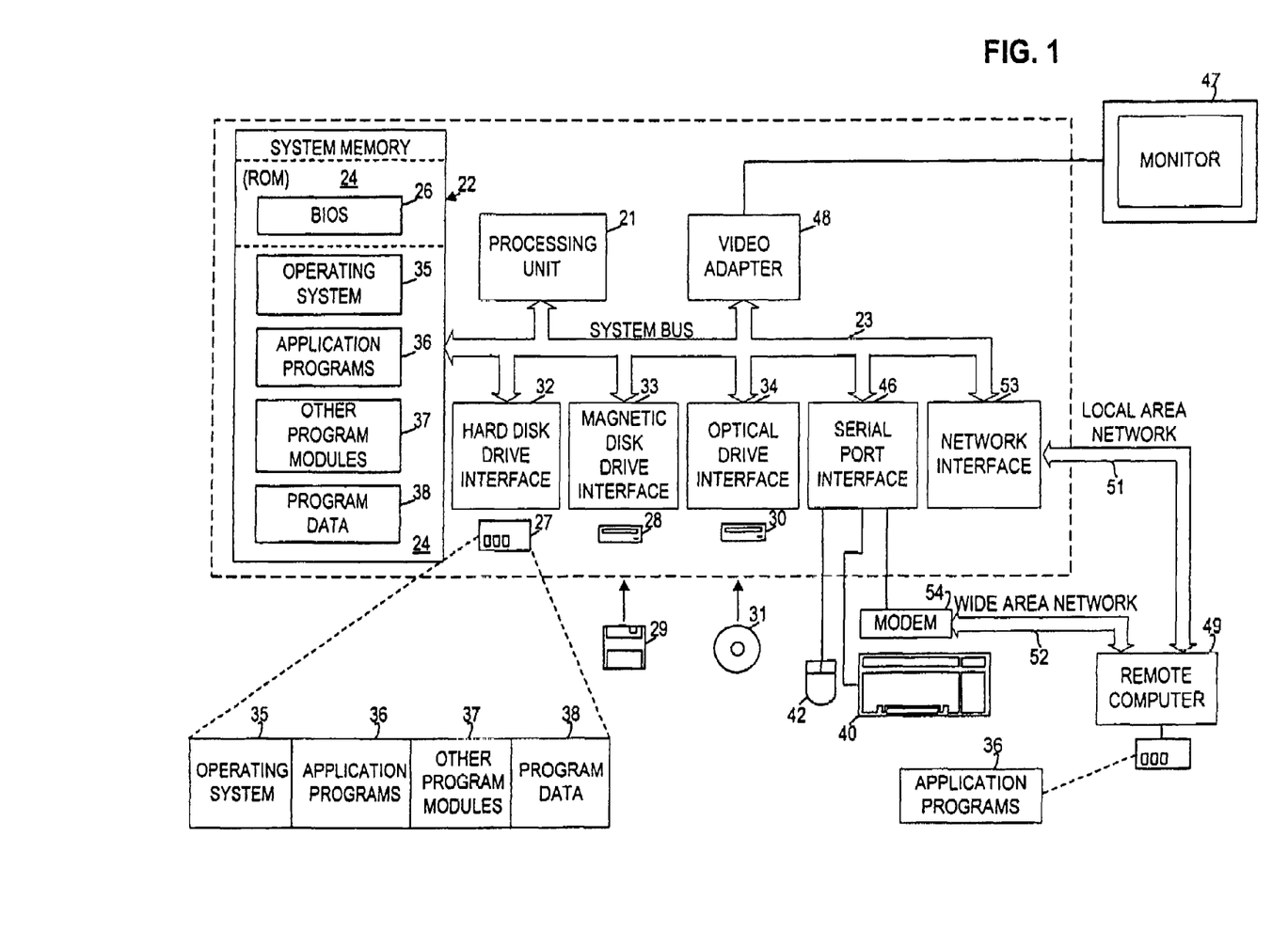
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Listening Horizon

Figure 2:
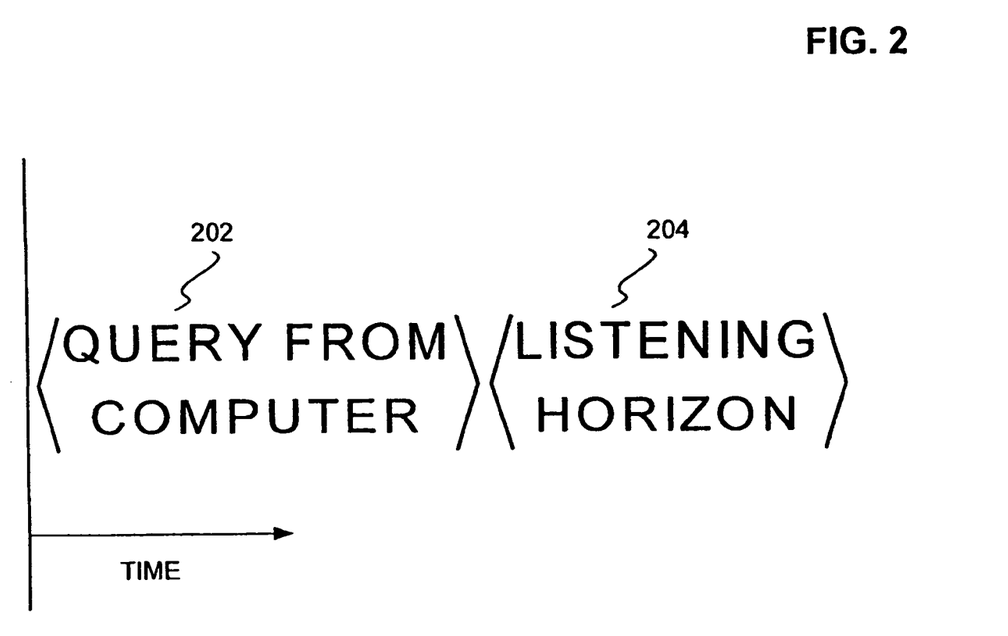
FIG. 2 is a diagram for understanding of what is meant by a listening horizon, according to an embodiment of the invention.

Prior to describing embodiments of the invention, an illustrative example as to what is meant by a listening horizon is first described. Referring to FIG. 2, on the time line a query 202 from the computer is first made. The query 202 can be visibly displayed as text on the screen, can be uttered by the computer through a speaker of or connected to the computer, etc.; the invention is not so limited. Once a query has been made, then the computer listens for an utterance from the user (through a microphone, for example), for a listening horizon 204. The listening horizon 204 can be a predefined length of time, or can be a function of the subject matter of the query 202, the prior listening history regarding the user, etc.; again, the invention is not so limited.

Utilizing a listening horizon 204 provides embodiments of the invention with advantages not found in the prior art. Primarily, the user does not have to utilize a push-to-talk functionality in order to converse with the computer. The computer automatically turns on speech recognition functionality for the duration of the listening horizon 204, instead. This provides for more natural, convenient and intuitive conversation between the user and the computer.

Methods

In this section of the detailed description, computer-implemented methods according to varying embodiments of the invention are described. The computer-implemented methods are desirably realized at least in part as one or more programs running on a computer (such as the computer of FIG. 1)—that is, as a program executed from a computer-readable medium such as a memory by a processor of a computer. The programs are desirably storable on a machine-readable medium such as a floppy disk or a CD-ROM, for distribution and installation and execution on another computer.

Figure 3:
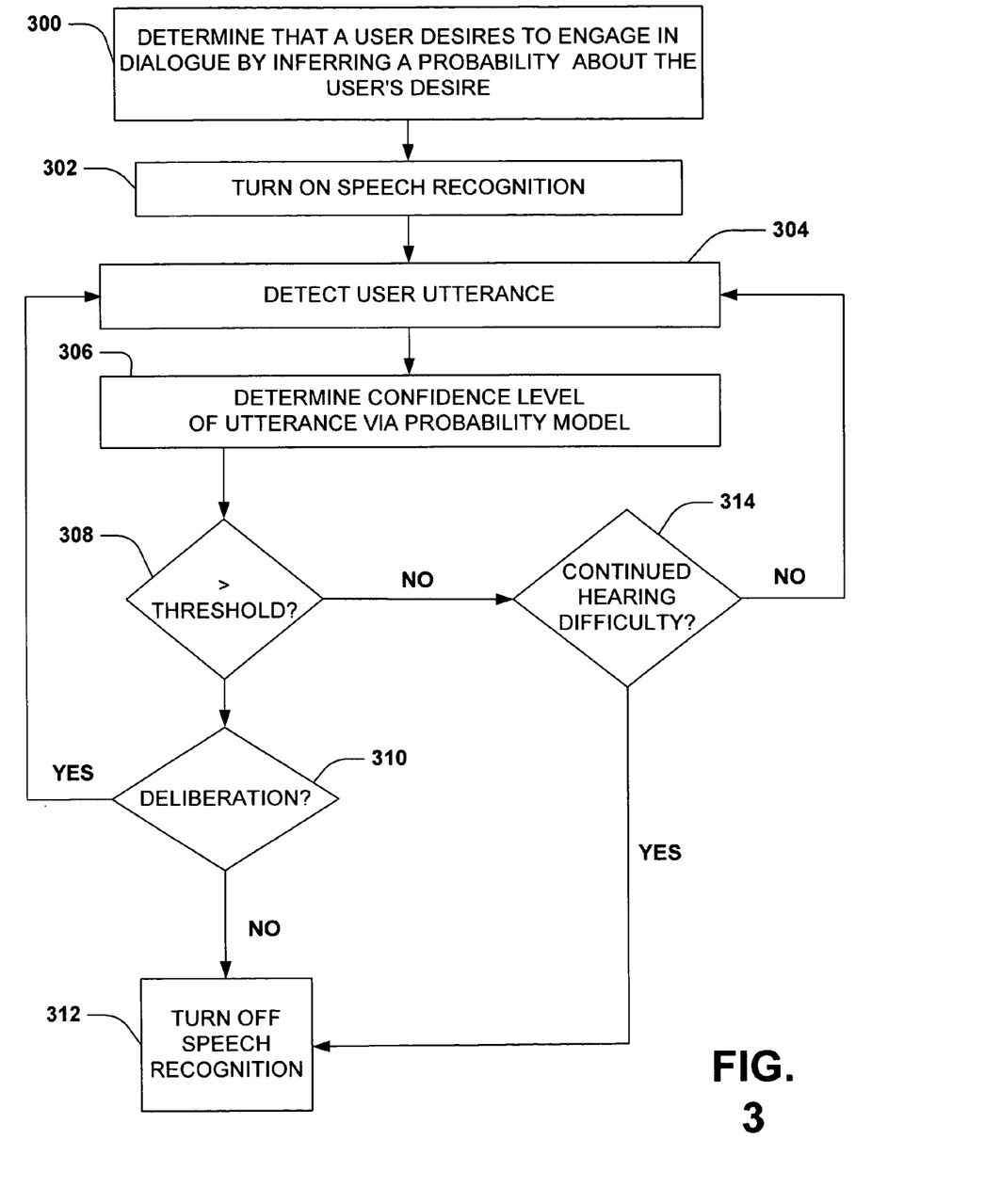
FIG. 3 is a flowchart of a method according to an embodiment of the invention; and, FIGS. 4(a)-4(d) are diagrams of automated assistants or agents that can be shown on the screen in varying situations, according to different embodiments of the invention.

Referring now to FIG. 3, a flowchart of a method according to one or more embodiments of the invention is shown. In 300, the method determines whether a user desires to engage in a dialog. As used herein, dialog can be generally defined as any utterance from a user directed to the computer for understanding by the computer (or other processor-based device). For example, dialog can be used to answer a query from the computer (in the case of the example of FIG. 2); it can be used to issue a command to the computer, as described in the background section; it can be used to dictate text to the computer, as also described in the background section; etc.—the invention is not so particularly limited.

In one particular embodiment, the method determines whether a user desires to engage in a dialog by inferring a probability that the user desires an automated service to be performed, and then performing a cost-benefit analysis to determine whether engaging in a dialog is the highest expected utility action of possible actions that can be taken. For example, the inferred probability can be referred to as an action probability, and in one particular instance as a scheduling probability—the probability that the user has a goal of an automated service (i.e., an action), such as scheduling a calendaring appointment. The probability can in one embodiment be based on a text, such as an electronic mail message, as well as on contextual information, such as recent user activity.

In one embodiment, inference of a probability is performed as described in the copending and coassigned application entitled "Systems and Methods for Directing Automated Services for Messaging and Scheduling", Ser. No. 09/295,146 (now issued U.S. Pat. No. 6,505,167), filed on Apr. 20, 1999, which is hereby incorporated by reference.

Performing a cost-benefit analysis to determine whether engaging in a dialog is the highest expected utility action is based on the inferred probability. That is, based on the inferred probability, for example, the method may determine to: (1) do nothing (inaction); (2) perform an action automatically; or, (3) suggest an action to the user (dialog). In the latter instance, then, the method would determine that the highest expected utility action is to engage in a dialog. For example, the computer may display an automated assistant of agent on the screen, such that the agent asks the user whether it should perform an action (e.g., the query 202 of FIG. 2 as has been described). That is, the method engages the user with a question, for example, regarding a desire for an automated service. If the agent is to render audible its question, such as through a speaker connected to or a part of the computer, then a text-to-speech functionality or mechanism, such as those known in and available within the art, is utilized. In one embodiment, the text-to-speech functionality used is the Speech Application Programming Interface (SAPI), available from Microsoft Corp. For example, version 4.0a of the SAPI may be used.

In one embodiment, determining whether engaging in a dialog is the highest expected utility action is also performed as described in the copending and coassigned application entitled "Systems and Methods for Directing Automated Services for Messaging and Scheduling", Ser. No. 09/295, 146(now issued U.S. Pat. No. 6,505,167), filed on Apr. 20, 1999, previously incorporated by reference.

In 302, the method turns on a speech recognition functionality. The speech recognition functionality is the mechanism by which utterances spoken by the user into a microphone or other audio-detection device connected to or a part of the computer or other processor-based device are converted into a form understandable by the computer. Speech recognition functionality is known and available within the art. In one embodiment, the speech recognition functionality used is the Speech Application Programming Interface (SAPI), available from Microsoft Corp. For example, version 4.0a of the SAPI may be used.

The speech recognition functionality is specifically turned on for a duration or length of time referred to as the listening horizon, such as the listening horizon 202 of FIG. 2. The listening horizon may be predefined by the user or the computer, or can be determined as a function. For example, the function may be a function of the inferred probability that the user desires automated service—a complex service that has been queried may result in the listening horizon being longer, for instance, than if the query relates to a relatively simple query. As another example, the listening horizon may be longer as the probability that the desires a service increases. Furthermore, the function may also be a function of an acute listening history—that is, the prior listening history between the computer and the user. Thus, if the computer has had difficulty in the past understanding user utterances, a longer listening horizon may be specified.

As part of turning on the speech recognition functionality, in one embodiment, an automated assistant or agent is displayed on the screen, having listening-for-user-utterances indications. For example, the agent may be displayed such that it is shown as being attentive to the user.

In 304 and 306, a user utterance is first detected during the listening horizon. That is, the user speaks into a microphone, such that the speech is detected by the computer, and translated into a form understandable by the computer by the speech recognition functionality (in 304). Desirably, the speech recognition functionality determines a confidence level of the utterance (in 306)—that is, a confidence level that what the functionality interpreted as the user saying is in fact what the user said. Such determination of confidence levels is a part of speech recognition functionality known and available within the art. In one embodiment, the confidence level is indicated as a percentage, from 0 to 1 (where 1 corresponds to 100% confidence of the utterance).

Thus, in one embodiment, the confidence level of the utterance is determined as described in the copending and coassigned patent application entitled "Confidence Measure Using A Near-Miss Pattern," filed on Nov. 13, 1998, Ser. No. 09/192,001 (now issued U.S. Pat. No. 6,571,210). In addition, in one embodiment, the confidence level is determined as this capability as provided by the Microsoft Speech Application Programming Interface (SAPI), as has been described.

Next, in 308, it is determined if the confidence level is greater than a predetermined threshold. If the confidence level is greater than this threshold, this indicates that the method believes it has understood what the user has said, and the method proceeds to 310. In 310, it is determined if the utterance spoken by the user relates to a deliberation on the part of the user, such as typical patterns of user dysfluency and reflection. For example, the method detects the user saying "ummm," "uhhh," and "hmmmm" as signs of thought and deliberation on the part of the user.

Figure 4A:
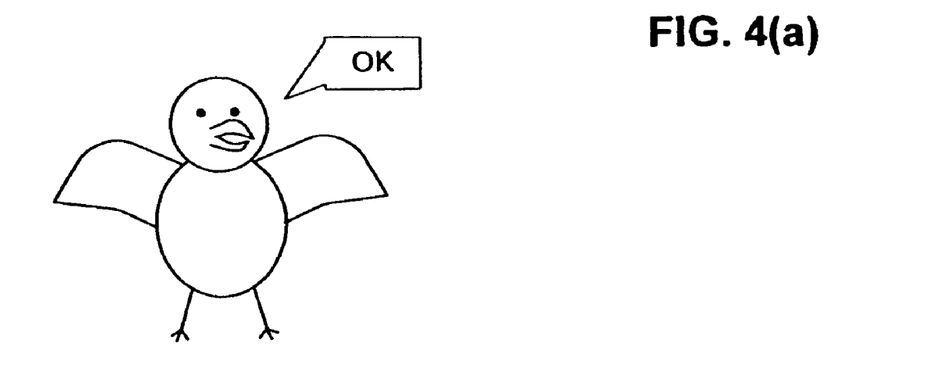
Figure 4B:
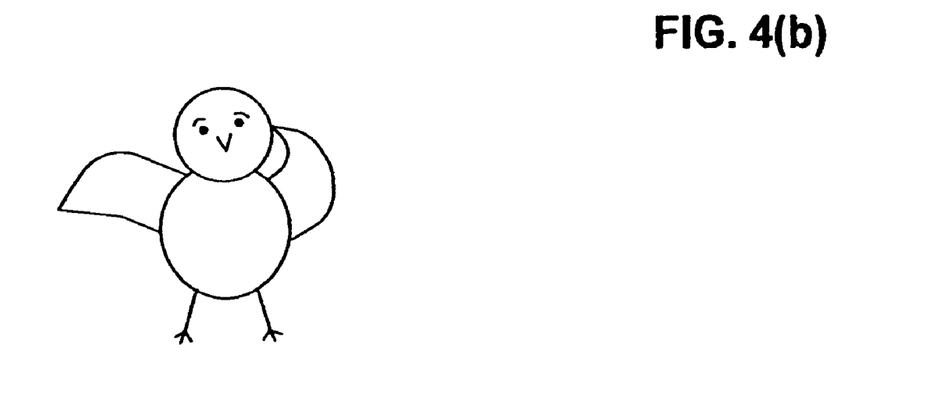

In such an instance, in one embodiment, an agent or automated assistant that is displayed on the screen is shown as indicating increased attentiveness to the user—that is, as if the agent understands that the user is thinking and about to say his or her real response. For example, the agent of FIG. 4(b) is shown—an agent in the form of a bird, having one wing lifted to its ear to indicate that it is listening to what the user is saying. The invention is not so limited, however.

Also, in one embodiment, in conjunction with the user conveying deliberation, the listening horizon can be extended so that the user has additional time to make an utterance. In any case, upon determining that the utterance is a deliberation in 310, the method proceeds back to 304, to detect a further utterance from the user.

If, however, the utterance is not a deliberation, then instead the utterance is a response from the user that should be acted upon. For example, in the case of the agent initially asking the user a question, the response may be an affirmative or negative utterance ("yes," "no," "yep", "nope," "not now," etc.). In such an instance, in one embodiment, the agent or automated assistant that is displayed on the screen is shown as indicating understanding as to what the user has said. For example, the agent of FIG. 4(a) is shown—an agent in the form of a bird, stating "OK," that it understands what the user has uttered. The invention is not so limited, however.

In any case, upon determining that the utterance is a response from the user that should be acted upon, then the method proceeds to 312, where the speech recognition functionality is turned off. The functionality is turned off because a responsive utterance with a confidence level greater than the predetermined threshold has been received from the user, and thus speech recognition is no longer necessary.

If, however, in 308, the confidence level of the utterance is not greater than the predetermined threshold, then the method proceeds instead to 314. In 314 it is determined whether the hearing difficulty encountered by the speech recognition system (viz., that it has not been able to determine over a predetermined threshold level what the user is saying, as measured by the confidence level of the utterance) is a continued hearing difficulty. In one embodiment, continued hearing difficulty is measured as a predetermined number of times that the user makes an utterance that the speech recognition functionality rates lower than the predetermined threshold. If the predetermined number of times is exceeded, then the method proceeds to 314 to 312, turning off speech recognition and ending the method. This is because there may be a problem with the equipment the user is using to convey utterances to the computer, etc., such that the speech recognition process should just be ended, instead of subjecting the user to potentially frustrating continued difficulty on the part of the computer to understand what the user is saying.

Figure 4C:
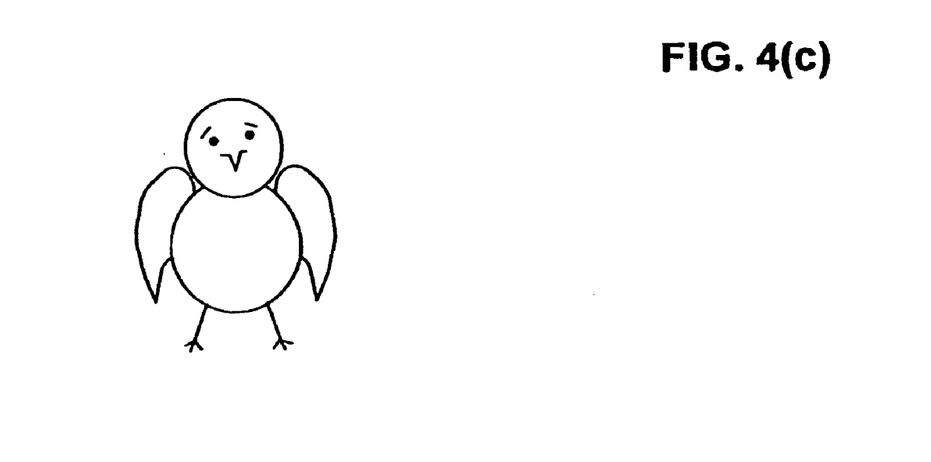
Figure 4D:
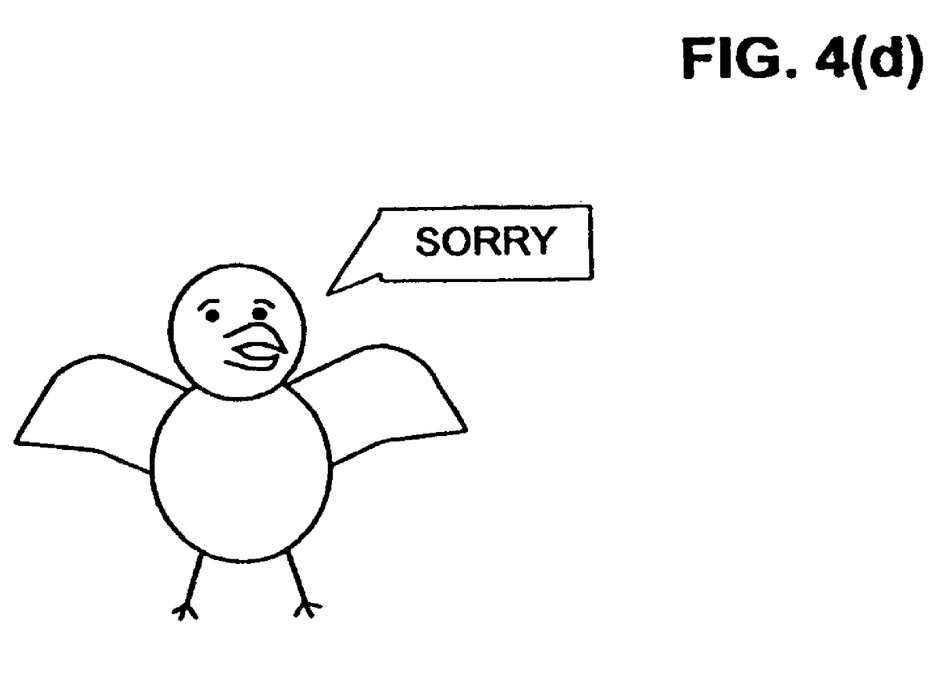

In such an instance, in one embodiment, an agent or automated assistant that is displayed on the screen is shown as indicating failure to hear and understand utterances to the user. For example, the agent of FIG. 4(d) is shown—an agent in the form of a bird, stating to the user "sorry, I am having repeated difficulty understanding you." The invention is not so limited, however.

If, however, continued hearing difficulty has not been encountered—for example, the predetermined number of times that a user utterance is lower than the predetermined threshold has not been exceed—the method instead proceeds back from 314 to 304, to continue to detect another user utterance. The listening horizon may also be extended in one embodiment to allow for the fact that the speech recognition system did not understand what the user had previously said with a confidence level greater than the predetermined threshold. In such an instance, in one embodiment, the agent or automated assistant that is displayed on the screen is shown as indicating hearing difficulty as to what the user has said. For example, the agent of FIG. 4(c) is shown—an agent in the form of a bird with a puzzled look on its face, and potentially also stating "can you repeat that please," to indicate that it did not understand what the user has uttered. The invention is not so limited, however.

Finally, not specifically shown in FIG. 3 is that if the listening horizon has expired before speech recognition is turned off in 312 as a result of an utterance with a level of confidence greater than the predetermined threshold that is not a deliberation (i.e., the method proceeding from 310 to 312), or as a result of continued hearing difficulty (i.e., the method proceeding from 314 to 312), then the method will automatically turn off the speech recognition functionality anyway (i.e., proceeding to 312 automatically). This corresponds to a situation where it is assumed that, for example, the user is busy, and thus for this or another reason does not wish to respond with an utterance. In such a situation, an agent or automated assistant may be displayed on the screen indicating sensitivity to the fact that the user is busy.

Once the speech recognition is turned off in 312, then in one embodiment, any displayed automated assistant or agent is removed (that is, not displayed). In one embodiment, the removal is accomplished after waiting a predetermined time, so that the user is able to see the gestures and behavior of the agent or automated assistant. The invention is not so limited, however.

Thus, the embodiment of FIG. 3 provides for advantages not found in the prior art. The embodiment allows for a dialog between a user and a computer or other processor-based device without requiring the user to press a push-to-talk button or key before making an utterance meant for understanding by the computer. This is accomplished by setting a listening horizon, which can be extended in certain situations as has been described. Furthermore, the embodiment of FIG. 3 provides for different handling of user utterances depending on whether the confidence level of the utterance is greater than a predetermined threshold, whether the utterance is a deliberation, whether the utterance is a response, whether the confidence level of the utterance is less than a predetermined threshold, or whether continued hearing difficulty is encountered.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. A computer-implemented method comprising:
   determining that a user desires to engage in a dialog based at least upon inferring a probability that the user desires an automated service;
   upon determining that the user desires to engage in a dialog, turning on a speech recognition functionality for a listening horizon, wherein the length of the listening horizon is determined as a function of at least an inferred probability that the user desires automated service; and,
   turning off the speech recognition functionality after the listening horizon has expired.

2. The method of claim 1, wherein determining that a user desires to engage in a dialog comprises performing a cost-benefit analysis to determine whether engaging in a dialog comprises a highest expected utility action.

3. The method of claim 2, wherein inferring a probability that the user desires an automated service is based upon at least one of text, contextual information, and recent user activity.

4. The method of claim 1, further comprising prior to turning on a speech recognition functionality, engaging the user with a question.

5. The method of claim 4, wherein engaging the user with a question comprises engaging the user with a question regarding a desire for an automated service.

6. The method of claim 4, wherein engaging the user with a question comprises displaying an automated assistant asking the question.

7. The method of claim 1, wherein determining a length of the listening horizon comprises determining the length of the listening horizon as a function of at least an inferred probability that the user desires automated service and an acute listening history.

8. The method of claim 1, wherein turning on a speech recognition functionality comprises displaying an automated assistant having listening-for-user-utterances indications.

9. The method of claim 1, further comprising prior to turning off the speech recognition functionality,
   detecting an utterance from the user during the listening horizon; and,
   determining a confidence level of the utterance.

10. The method of claim 9, further comprising prior to turning off the speech recognition functionality, upon determining that the confidence level of the utterance is greater than a predetermined threshold, displaying an automated assistant indicating understanding and proceeding to turning off the speech recognition functionality.

11. The method of claim 9, further comprising prior to turning off the speech recognition functionality, upon determining that the confidence level of the utterance is greater than a predetermined threshold and the utterance indicates deliberation, displaying an automated assistant indicating increased attentiveness and continuing to detecting an utterance from the user during the listening horizon.

12. The method of claim 9, further comprising prior to turning off the speech recognition functionality, upon determining that the confidence level of the utterance is less than a predetermined threshold, displaying an automated assistant indicating hearing difficulty and continuing to detecting an utterance from the user during the listening horizon.

13. The method of claim 9, further comprising prior to turning off the speech recognition functionality, upon determining that the confidence level of the utterance is less than a predetermined threshold, and based on continued hearing difficulty, displaying an automated assistant indicating failure to hear and proceeding to turning off the speech recognition functionality.

14. The method of claim 1, further comprising prior to turning off the speech recognition functionality, upon failure to detect an utterance from the user and upon expiration of the listening horizon, displaying an automated assistant indicating sensitivity that the user is busy and proceeding to turning off the speech recognition functionality.

15. A computer-implemented method comprising:
   determining that a user desires to engage in a dialog based at least upon inferring a probability that the user desires an automated assistant;
   upon determining that the user desires to engage in a dialog,
      engaging the user with a question;
      displaying an automated assistant asking the question;
      turning on a speech recognition functionality for a listening horizon;
      during the listening horizon,
         detecting an utterance from the user;
         determining a confidence level of the utterance, wherein the automated assistant indicates understanding of the utterance if the confidence level is above a predetermined threshold; and,
      no later than after expiration of the listening horizon,
         removing the automated assistant;
         turning off the speech recognition functionality.

16. The method of claim 15, wherein determining that a user desires to engage in a dialog further comprises performing a cost-benefit analysis to determine whether engaging in a dialog comprises a highest expected utility action.

17. The method of claim 15, wherein engaging the user with a question comprises engaging the user with a question regarding a desire for an automated service.

18. A machine-readable medium having instructions stored thereon for execution by a processor to cause performance of a method comprising:
   determining that a user desires to engage in a dialog based at least upon inferring a probability that the user desires an automated agent;
   upon determining that the user desires to engage in a dialog, turning on a speech recognition functionality for a listening horizon, wherein the length of the listening horizon is determined as a function of at least an inferred probability that the user desires automated service; and,
   turning off the speech recognition functionality after the listening horizon has expired.

* * * * *